INVENTOR.
Fritz Knoll
BY

INVENTOR.
FRITZ KNOLL
BY MICHAEL S STRIKER
ATTORNEY 2,911,717

CUTTING TOOL HAVING A RETRACTABLE PROTECTIVE CASING

Fritz Knoll, Konstanz, Bodensee, Germany

Application February 25, 1957, Serial No. 642,112

Claims priority, application Germany February 23, 1956

15 Claims. (Cl. 30—272)

The present invention relates to cutting tools.

More particularly, the present invention relates to that type of cutting tool wherein a cutting blade reciprocates back and forth. Such a tool may be used, for example, for cutting the hides of slaughtered animals.

It is customary to enclose a cutting blade of this type within a protecitve casing beyond which the cutting blade moves through only a limited distance so as to control the depth of the cut as well as to protect the operator.

One of the objects of the present invention is to provide a cutting tool of the above type which enables the protective casing therefor to be retracted from its operating position to expose the cutting blade sufficiently to permit sharpening thereof.

Another object of the present invention is to provide a cutting tool which enables the protective casing to be returned after sharpening of the blade to exactly the same position it had before sharpening of the blade.

A further object of the present invention is to provide a cutting blade of the above type which ordinarily does not require readjustment of the protective casing after the blade is sharpened.

An additional object of the present invention is to provide a cutting tool which does not require any screws or the like to be removed in order to retract the protective casing when it is desired to sharpen the blade.

Still another object of the present invention is to provide a cutting tool which does not require turning of any screws or the like in order to retract the protective casing. This feature is of particular significance with a cutting tool used by a butcher, for example, because the cutting tool has fat and skin fibers deposited thereon which render the parts thereof slippery so that any turning of screws or the like would be extremely inconvenient.

It is also an object of the invention to provide a cutting tool which, when its protective casing is retracted, permits the butcher, for example, to have both hands free for sharpening purposes, one hand carrying the tool and the other hand carrying a whetting steel, for example.

The objects of the invention also include the provision of a cutting tool capable of accomplishing all of the above objects with simple and ruggedly constructed elements which are very easily and conveniently manipulated.

With the above objects in view, the present invention mainly consists of a cutting tool which includes an elongated handle member and an elongated carrier member fixed to the upper portion of the handle member and extending forwardly therefrom. An elongated cutting blade is adapted to be connected to the handle member for reciprocating movement with respect thereto, and the carrier member extends along an upper edge of the cutting blade. A protective casing slidably engages the carrier member for forward and rearward movement with respect thereto, and this protective casing has a pair of substantially coextensive, substantially parallel spaced side walls terminating in spaced bottom edges extending substantially along the bottom edge of the blade, these side walls defining between themselves a space in which the blade reciprocates and in which at least a forward portion of the carrier member is located. A manually operable means is connected either to the handle member or the carrier member and operatively engages the protective casing for retracting the latter from and returning the latter to an operating position, so that the casing will always have the same operating position irrespective of the sharpening of the blade. An adjusting means is provided for adjusting the position of the protective casing to compensate for a decrease in the width of the blade after the latter has been sharpened considerably, so as to be worn away by a substantial amount.

The novel features which are considered as characteristic for the invention are set forth in particular in the appended claims. The invention itself, however, both as to its construction and its method of operation, together with additional objects and advantages thereof, will be best understood from the following description of a specific embodiment when read in conjunction with the accompanying drawing which shows one possible construction in accordance with the present invention in a fragmentary, partly sectional side elevational view and in which:

Figure 1:
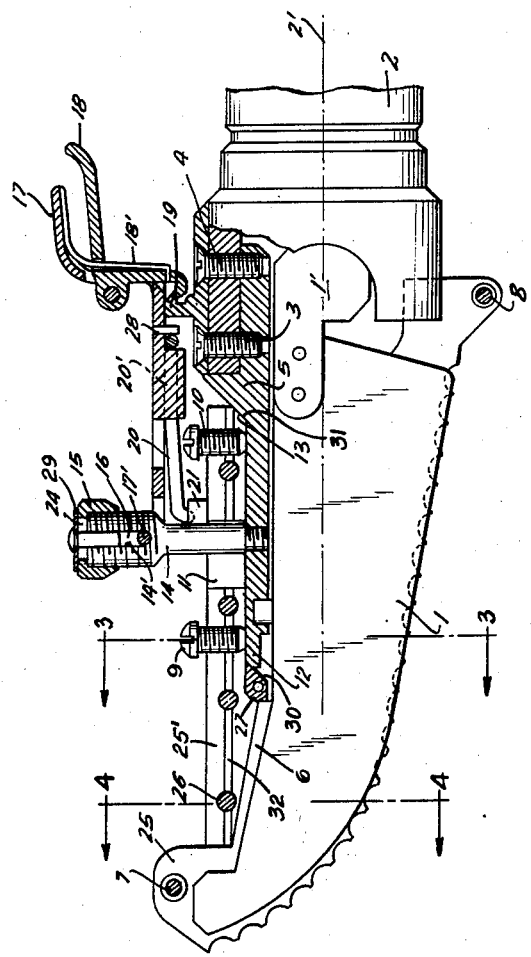
Fig. 1 is a longitudinal sectional view of the cutting tool with the protective casing in operating position on the carrier member.

In the drawing, the cutting blade 1 is shown connected by a suitable means 1' to an elongated handle member 2. A reciprocating means is located in the handle member 2, and this reciprocating means may be of any well-known construction and includes the means 1' riveted to the upper rear portion of the cutting blade 1. Also the means 1' may be fixed in such a way to allow the adjustment of the blade 1 in the direction of the longitudinal axis 2' with respect to the reciprocating means. For instance, means 1' and blade 1 may be connected by screws and nuts and either the blade 1 or the means 1' may be provided with elongated holes through which the screws pass. It will be noted that the bottom cutting edge of the cutting blade 1 extends forwardly and upwardly with respect to the longitudinal axis 2' of the handle member 2, this axis 2' forming a line extending longitudinally of the blade 1 and along which the blade 1 reciprocates back and forth when the operator switches on the reciprocating means housed within the handle member 2. It will be noted that the forward portion of the cutting edge of the blade 1 is curved upwardly and that the blade is substantially pointed at its front end. A pair of screw members 3 and 4 serve to connect to a front upper portion of the handle member 2 an elongated carrier member 5 which extends forwardly from the handle member 2 in a direction substantially parallel to the line 2', the carrier member 5 extending along the upper edge of the blade 1. The handle member 2 and the carrier member 5 form a support means for supporting the elongated cutting blade 1 for longitudinal reciprocating movement.

A protective casing 6 is connected with this support means 2, 5 for movement with respect thereto forwardly to and rearwardly from an operating position shown in the drawing, a suitable manually operable means which is described below moving the protective casing 6 forwardly and rearwardly and maintaining the protective casing 6 in proper operative relationship with the support means 2, 5.

Figure 4:
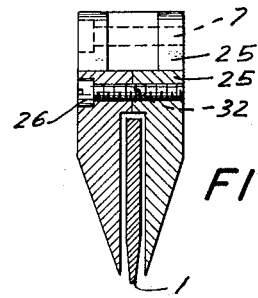
Fig. 4 is a cross-sectional view taken on line 4—4 of Fig. 1 through the front end portion of the casing projecting beyond the carrier member.
Figure 5:
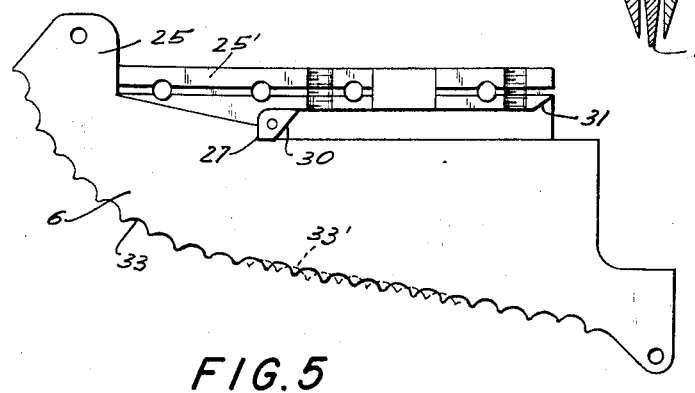
Fig. 5 is a view showing one casing half with an insert attached thereto and illustrating a part of the bottom edge of the other casing half in phantom to show the relative position of the two bottom edges.

The protective casing 6 includes a pair of substantially coextensive, substantially parallel spaced side walls, only one of which is shown in the drawing. Thus, the side wall 25 of the protective casing 6 is shown in the drawing behind the blade 1, and this side wall has an upper portion 25' extending from the remainder of the side wall 25 partly over the top surface of the blade 1. The unillustrated side wall of the protective casing 6 is a mirror image of the side wall 25 and is symmetrically arranged with respect to the same. The bottom edge 33' of the side wall 25 of the casing 6 opposite to side wall shown in Figs. 1 and 5 is arranged relative to the bottom edge 33 of the side wall in such a manner that the crest portions of these two bottom edges are staggered with respect to each other as shown in Fig. 5 in which part of the bottom edge 33' is shown in phantom. The portion of the unillustrated side wall which corresponds to the portion 25' of the wall 25 extends toward the latter wall and also extends partly over the top of the blade 1. The two side walls are interconnected by a plurality of screws 26 and the distance between the side walls is determined by suitable spacers or the like. The upper portions 25' of the two halves of the casing 6 may also abut against each other without the use of spacers as shown in Fig. 4. Preferably a small groove 32 is formed in the region of the screws 26 in one of the upper portions 25', for instance in the right portion as shown in Fig. 4.

A particular feature of the present invention resides in connecting together a front upper portion of the side walls by a fastener 7 in the form of a bolt and nut, for example, with a suitable spacer located between the side walls, and an identical fastener 8 is located at the lower bottom ends of the side walls of the protective casing 6.

Thus, the side walls of the protective casing 6 define between themselves an elongated space in which at least a forward portion of the carrier member 5 is located and in which the blade 1 reciprocates. It will be noted that the bottom edge of each side wall extends substantially along the cutting edge of the blade 1 and is formed with a series of closely spaced arcuate notches. The cutting edge of the blade 1 scarcely extends to the line connecting the crest portions of the undulating bottom edges of the side walls. The blade 1 is shown in the drawing in the middle position of its stroke and from the position shown in the drawing, the blade 1 is moved forwardly and backwardly so that its cutting edge moves through a limited distance beyond the open bottom of the space between the side walls of the protective casing 6. The greatest amplitude is about 2 to 2½ millimeters in each of both directions.

The side walls of the protective casing 6 are formed over the carrier member 5 with portions of threaded openings which respectively receive the screws 9 and 10 which serve as adjusting means for adjusting the elevation of the protective casing 6 with respect to the blade 1 so that when the latter becomes worn enough to substantially reduce its width, as by a number of sharpenings, the screws 9 and 10 may be turned to raise the protective casing 6 with respect to the support means 2, 5 so that the bottom edges of the side walls of the casing 6 will have the proper relationship with the blade 1. It will be noted that the bottom ends of the screws 9 and 10 are slidable along the top of the carrier member 5.

The upper portion of the protective casing 6, formed by the upper portions of the side walls thereof, is formed with an elongated slot 11 located over the carrier member 5 and through which the carrier member is accessible for a purpose described below.

A spacer member 27 is fixed between the side walls of the casing 6, and this spacer member 27 terminates at its right end in a downwardly directed surface 30 which is inclined upwardly and rearwardly with respect to the axis 2' and which cooperates with an identically inclined upper surface portion 12 at the front end of the carrier member 5. The carrier member 5 is provided with another surface portion 13 longitudinally spaced rearwardly from the surface portion 12 and also inclined upwardly and rearwardly with respect to the axis 2'. The side walls which form the protective casing 6 are provided at their rear upper end portions with downwardly directed surfaces 31, respectively, which are inclined upwardly and rearwardly and which provide the casing 6 with another surface portion slidably engaging the surface portion 13, so that all of these inclined surface portions cooperate to form a guide means for guiding the protective casing 6 for movement upwardly and rearwardly during retraction and forwardly and downwardly upon return of the casing 6 to its operative position.

In accordance with the present invention a manually operable means is provided for moving the protective casing 6 between its operative and retracted positions, and this manually operable means includes the lever means 14, 17, releasably fixed by a manually operable means 18, 19 to the handle member 2 and including a spring means 20 described in greater detail below.

This lever means includes a stationary portion in the form of a pin 14 extending downwardly through the slot 11 and fixed to the carrier member 5 as by being threadedly connected thereto. Thus, the pin 14 cooperates with the ends of the slot 11 to limit the longitudinal movement of the protective casing 6. The pin 14 is formed with an axially extending slot 14' extending downwardly from its top end and the turnable portion 17 of the lever means has at its front end a transverse part 17' extending transversely through the slot 14'. Behind the transverse portion 17' the lever 17 is formed with an opening through which the part of the pin 14 to the right of slot 14', as viewed in the drawing, extends so that the front transverse part 17' serves to pivotally connect the lever 17 to the pin 14.

The means for releasably fixing the lever 17 to the handle member 2 includes the spring pressed pawl 18 pivotally carried by the lever 17 in an opening of the latter and urged to turn in a clockwise direction, as viewed in the drawing, by a leaf or wire spring 18'. A detent 19 is fixed by the screws 3 and 4 to the handle member 2 and cooperates with the pawl 18 in the manner shown in the drawing to maintain the lever 17 releasably in the position shown in the drawing.

As was mentioned above, a spring means is carried by the lever 17 and urges the protective casing 6 downwardly with respect to the carrier member 5. This spring means is in the form of an elongated, substantially U-shaped wire spring 20, one leg of which is shown in the drawing. The rear end portions of the legs of the spring 20 extend along and are located in lateral, outwardly directed grooves formed in the side faces of portion 20' of the lever 17 and a pin 28 is fixed to the lever 17 and engages the rear end of the spring 20 to cooperate with the portion 20' for preventing longitudinal shifting of the spring 20 with respect to the lever 17. The free forward end portions of the spring 20 are respectively curved downwardly and respectively extend into upper recesses respectively formed in portions 21 of the side walls of the protective casing 6, so that in this way the spring 20 presses against the protective casing 6 to urge the latter downwardly.

It will be noted that the spring means also urges the transverse portion 17' of the lever 17 upwardly, and an adjusting means cooperates with the pin 14 and the lever 17 for limiting the upward movement of the transverse portion 17' and thus controlling the elevation of the turning axis of the lever 17. This adjusting means includes a block 16 slidably located in the slot 14' and engaging the top face of the transverse portion 17' of the lever 17. A nut 15 threadedly engages the top end portion of the pin 14 and fixedly carries a disc 29 to which the block 16 is rotatably connected, this block 16 extending axially downwardly along the slot 14' so that by turning the nut 15 on the pin 14 the extent to which the spring 20 raises the forward portion 17' of the lever 17 can be controlled.

Figure 2:
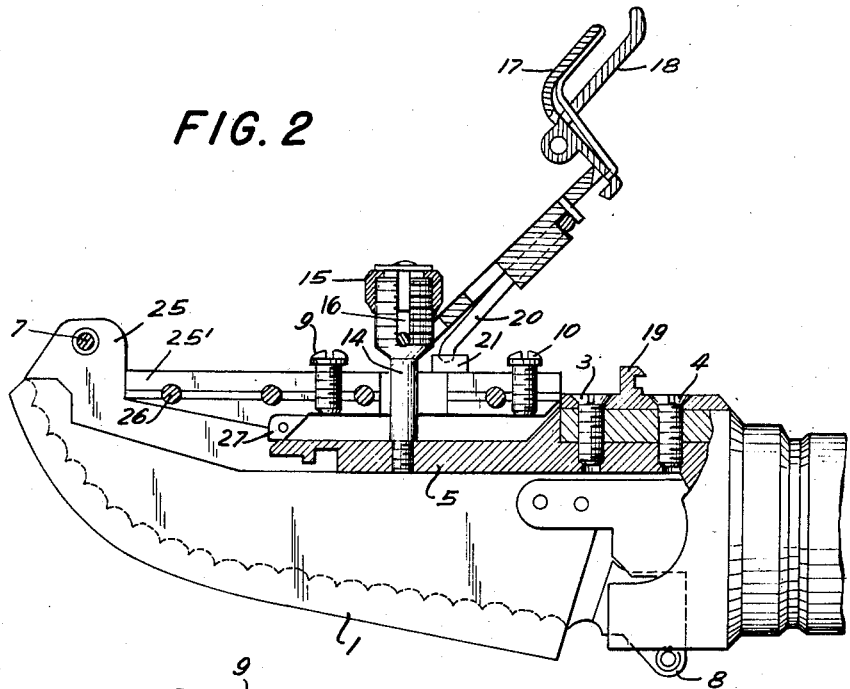
Fig. 2 is a view similar to Fig. 1 showing the protective casing retracted to inoperative position.
Figure 3:
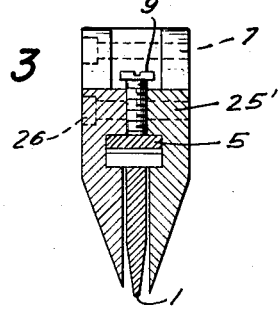
Fig. 3 is a cross-sectional view taken on line 3—3 of Fig. 1 through the rear end portion of the casing and the carrier member.

Assuming that it is desired to sharpen the blade 1 and that the parts have the position shown in Fig. 1, then it is only necessary for the operator to grasp the rear end of the lever 17 while at the same time turning the pawl 18 in a counter-clockwise direction, as viewed in Fig. 1, such turning of the pawl 18 resulting from simultaneous grasping of the pawl 18 and the lever 17. The turning of the pawl 18 against the influence of the spring 18' releases the lever 17 and the operator now turns this lever forwardly and upwardly in a counter-clockwise direction, as viewed in Fig. 1. As a result, the forward end portions of the spring 20 through their cooperation with the portions 21 of the protective casing 6 will cause the latter to shift rearwardly on the carrier member 5, and the inclined surface portions will cause the protective casing 6 to move upwardly as well as rearwardly so as to expose the cutting edge of the blade 1 sufficiently to permit this cutting edge to be sharpened. Fig. 2 of the drawing shows the structure with the protective casing moved to an inoperative position exposing the cutting edge of the blade 1. It will be noted that the forward ends of the spring 20 terminate at the right of the axis of the pin 14. It will be noted that the casing 6 can only be moved rearwardly until the left end of the slot 11, as viewed in the drawing, engages the pin 14. The lever 17 will remain in the position to which it is turned when the protective casing 6 has been fully retracted.

Now the blade 1 may be sharpened, and in order to return the protective casing 6 to its operating position, the operator need only turn the lever 17 in a clockwise direction, as viewed in the drawing, until the pawl 18 snaps onto the detent 19, the spring 20 shifting the casing 6 forwardly to its operating position at this time. It will be noted that with this construction the casing 6 will be accurately returned after sharpening to the same position it had before sharpening.

When it becomes necessary to adjust the elevation of the protective casing 6, the screw members 9 and 10 are easily turned for this purpose. If these screw members have been turned to such an extent that the spring 20 presses downwardly on the casing 6 with too great a force, then it is only necessary to turn the nut 15 so that it advances upwardly along the pin 14 and in this way the proper spring pressure is obtained.

It will be understood that each of the elements described above, or two or more together, may also find a useful application in other types of cutting tools differing from the types described above.

While the invention has been illustrated and described as embodied in reciprocating cutting tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A cutting tool comprising, in combination, support means for supporting an elongated cutting blade for longitudinal reciprocating motion; a protective casing having a pair of substantially coextensive, substantially parallel spaced side walls defining between themselves an elongated space open at its bottom and in which the blade reciprocates, a bottom cutting edge of the blade moving through a predetermined distance beyond said casing through said open bottom of said space during reciprocation of the blade; and manually operable means connecting said casing with said support means for movement with respect to the latter between an operating position substantially covering the blade in its entirety at one end of the stroke thereof and a retracted position exposing the cutting edge of the blade for sharpening, whereby said casing will always be returned after sharpening of the blade to the operating position it had with respect to said support means before sharpening of the blade.

2. A cutting tool comprising, in combination, support means for supporting an elongated cutting blade for longitudinal reciprocating motion; a protective casing having a pair of substantially coextensive, substantially parallel spaced side walls defining between themselves an elongated space open at its bottom and in which the blade reciprocates, a bottom cutting edge of the blade moving through a predetermined distance beyond said casing through said open bottom of said space during reciprocation of the blade; manually operable means connecting said casing with said support means for movement with respect to the latter between an operating position substantially covering the blade in its entirety at one end of the stroke thereof and a retracted position exposing the cutting edge of the blade for sharpening, whereby said casing will always be returned after sharpening of the blade to the operating position it had with respect to said support means before sharpening of the blade; and adjusting means engaging said casing and support means for adjusting the operating position of said casing with respect to said support means to allow for wear of the blade.

3. A cutting tool comprising, in combination, support means for supporting an elongated cutting blade for reciprocating motion along a straight line extending longitudinally of the blade, the latter having a bottom cutting edge inclined with respect to said line; a protective casing having a pair of substantially coextensive, substantially parallel spaced side walls terminating respectively in elongated bottom edges inclined with respect to said line in substantially the same way as the edge of the blade, said side walls defining between themselves an elongated space open at its bottom and in which the blade reciprocates so that the bottom cutting edge of the blade will move through a predetermined distance beyond said edges of said side walls of said casing during reciprocation of the blade; and manually operable means connecting said casing with said support means for movement with respect to the latter from a forward operating position substantially covering the blade in its entirety at one end of the stroke thereof rearwardly to a retracted position exposing the cutting edge of the blade for sharpening and from said retracted position back to said operating position, so that the operating position of said casing with respect to said support means is the same after sharpening of the blade as before sharpening thereof.

4. A cutting tool comprising, in combination, support means for supporting an elongated cutting blade for reciprocating motion along a straight line extending longitudinally of the blade, the latter having a bottom cutting edge inclined with respect to said line; a protective casing having a pair of substantially coextensive, substantially parallel spaced side walls terminating respectively in elongated bottom edges inclined with respect to said line in substantially the same way as the edge of the blade, said side walls defining between themselves an elongated space open at its bottom end in which the blade reciprocates so that the bottom cutting edge of the blade will move through a predetermined distance beyond said edges of said side walls of said casing during reciprocation of the blade; manually operable means connecting said casing with said support means for movement with respect to the latter from a forward operating position substantially covering the blade in its entirety at one end of the stroke thereof rearwardly to a retracted position exposing the cutting edge of the blade for sharpening and from said retracted position back to said operating position, so that the operating position of said casing with respect to said support means is the same after sharpening of the blade as before sharpening thereof; and guide means forming part of said support means and said casing for guiding said casing for movement upwardly with respect to said line as well as rearwardly during movement of said casing from said operating to said retracted position thereof.

5. A cutting tool comprising, in combination, support means for supporting an elongated cutting blade for reciprocating motion along a straight line extending longitudinally of the blade, the latter having a bottom cutting edge inclined with respect to said line; a protective casing having a pair of substantially coextensive, substantially parallel spaced side walls terminating respectively in elongated bottom edges inclined with respect to said line in substantially the same way as the edge of the blade, said side walls defining between themselves an elongated space open at its bottom and in which the blade reciprocates so that the bottom cutting edge of the blade will move through a predetermined distance beyond said edges of said side walls of said casing during reciprocation of the blade; manually operable means connecting said casing with said support means for movement with respect to the latter from a forward operating position substantially covering the blade in its entirety at one end of the stroke thereof rearwardly to a retracted position exposing the cutting edge of the blade for sharpening and from said retracted position back to said operating position, so that the operating position of said casing with respect to said support means is the same after sharpening of the blade as before sharpening thereof; said manually operable means resiliently pressing a part of said casing against a part of said support means.

6. A cutting tool comprising, in combination, an elongated handle member; means cooperating with said handle member for connecting an elongated cutting blade thereto in a position extending forwardly therefrom for reciprocating movement along a straight line extending longitudinaly of said handle member; a carrier member fixed to and extending forwardly from said handle member above and substantially parallel to said line along a top edge of a blade connected to said handle member; an elongated protective casing having a pair of substantially coextensive, substantially parallel spaced side walls between which at least a forward portion of said carrier member is located, said side walls respectively terminating in spaced bottom edges located adjacent and extending substantially along the bottom edge of the cutting blade, said side walls defining between themselves an elongated space in which said blade reciprocates, said casing having a portion slidably engaging a portion of said carrier member for guiding said casing for movement forwardly and rearwardly with respect to the latter member; lever means having a stationary portion fixed to said carrier member and a turnable portion turnably connected to said stationary portion for movement to and from an operating position with respect to said handle member and carrier member; manually operable means releasably fixing said turnable portion of said lever means to one of said members; and spring means carried by said lever means, engaging said casing, and urging the latter against said carrier member.

7. A cutting tool as recited in claim 6, and wherein said turnable portion of said lever means extends rearwardly from said stationary portion thereof and wherein said spring means has at least one forward free end portion bearing against said casing and a rear end portion fixed to said turnable portion of said lever means, said casing being formed with a recess into which said forward free end portion of said spring means extends and said turnable portion of said lever means being turnable upwardly away from said casing and forwardly away from said handle member upon turning of said turnable portion of said lever means away from its operating position, whereby during turning of said turnable portion of said lever means from its operating position, said forward end portion of said spring means moves said casing rearwardly along said carrier member.

8. A cutting tool as recited in claim 6 and wherein said manually operable means releasably fixing said turnable portion of said lever means to said one member is in the form of a spring pressed pawl turnably carried by said turnable portion of said lever means and a detent fixed to said one member and cooperating with said pawl.

9. A cutting tool as recited in claim 6 and wherein said casing includes means connecting said side walls with each other, the latter means including a forward fastener fixed to an upper forward end portion of said side walls and a rear fastener fixed to a lower rear portion of said side walls.

10. A cutting tool comprising, in combination, an elongated handle member; means cooperating with said handle member for connecting an elongated cutting blade thereto in a position extending forwardly therefrom for reciprocating movement along a straight line extending longitudinally of said handle member; a carrier member fixed to and extending forwardly from said handle member above and substantially parallel to said line along a top edge of a blade connected to said handle member; an elongated protective casing having a pair of substantially coextensive, substantially parallel spaced side walls between which at least a forward portion of said carrier member is located, said side walls respectively terminating in spaced bottom edges located adjacent and extending substantially along the bottom edge of the cutting blade, said side walls defining between themselves an elongated space in which said blade reciprocates, said casing having a portion slidably engaging a portion of said carrier member for guiding said casing for movement forwardly and rearwardly with respect to the latter member; lever means having a stationary portion fixed to said carrier member and a turnable portion turnably connected to said stationary portion for movement to and from an operating position with respect to said handle member and carrier member; manually operable means releasably fixing said turnable portion of said lever means to one of said members; spring means carried by said lever means, engaging said casing, and urging the latter against said carrier member; and adjusting means engaging said casing and carrier member for adjusting the elevation of said casing with respect to said line.

11. A cutting tool comprising, in combination, an elongated handle member, a carrier member fixed to an upper portion of said handle member and extending forwardly from the latter in a direction substantially parallel to a longitudinal axis of said handle member, said carrier member having a pair of longitudinally spaced upper surface portions inclined upwardly and rearwardly with respect to said axis; a protective casing for covering a cutting blade, said casing having a pair of substantially coextensive, substantially parallel side walls respectively terminating in spaced bottom edges and defining between themselves a space in which at least a forward portion of said carrier member is located, said casing having between said side walls a pair of longitudinally spaced downwardly directed surface portions also inclined upwardly and rearwardly with respect to said axis and respectively slidably engaging said upper surface portions of said carrier member; and manually operable means fixed to one of said members and operatively engaging said casing for retracting the latter from and returning the latter to an operating position, said surface portions of said casing respectively cooperating with said surface portions of said carrier member for guiding said casing for movement upwardly and rearwardly with respect to said carrier member during retraction of said casing and downwardly and forwardly with respect to said carrier member during return of said casing to its operating position.

12. A cutting tool comprising, in combination, a handle member; a carrier member fixed to and extending forwardly from said handle member; a protective casing having an upper portion slidably engaging said carrier member for guiding said casing for movement forwardly and rearwardly with respect to said carrier member, said upper portion of said casing being formed with an elongated slot through which a portion of said carrier member is accessible, said casing including a pair of spaced, parallel side walls extending downwardly from said upper portion of said casing and defining between themselves a space in which at least a forward portion of said carrier member is located; a pin fixed to said carrier member and extending upwardly through and beyond said slot of said casing so that the movement of the latter is limited by engagement between said pin and the ends of said slot; a lever extending rearwardly from said pin and pivotally connected to an upper portion thereof located beyond said casing; means releasably fixing a rear portion of said lever to one of said members; an elongated spring means having a rear end portion fixed to said lever and a front end portion operatively engaging and pressing against said casing at a part thereof located rearwardly of the axis of said pin, so that when said lever is turned upwardly and forwardly said spring means will shift said casing rearwardly along said carrier member.

13. A cutting tool comprising, in combination, a handle member; a carrier member fixed to and extending forwardly from said handle member; a protective casing having an upper portion slidably engaging said carrier member for guiding said casing for movement forwardly and rearwardly with respect to said carrier member, said upper portion of said casing being formed with an elongated slot through which a portion of said carrier member is accessible, said casing including a pair of spaced, parallel side walls extending downwardly from said upper portion of said casing and defining between themselves a space in which at least a forward portion of said carrier member is located; a pin fixed to said carrier member and extending upwardly through and beyond said slot of said casing so that the movement of the latter is limited by engagement between said pin and the ends of said slot; a lever extending rearwardly from said pin and pivotally connected to an upper portion thereof located beyond said casing; means releasably fixing a rear portion of said lever to one of said members; an elongated spring means having a rear end portion fixed to said lever and a front end portion operatively engaging and pressing against said casing at a part thereof located rearwardly of the axis of said pin, so that when said lever is turned upwardly and forwardly said spring means will shift said casing rearwardly along said carrier member; and adjusting means carried by an upper portion of said pin and cooperating with the latter and with said lever for adjusting the elevation of the turning axis of said lever along said pin.

14. A cutting tool as recited in claim 13, said pin having an upper portion formed with an axially extending slot and said lever having at its front end a transverse portion extending through said slot for turnably connecting said lever to said pin, said spring means urging said transverse portion of said lever upwardly in said slot, and said adjusting means including a block located in said slot above and engaging said transverse portion of said lever, a nut threadedly connected to said upper portion of said pin, said block being rotatably connected to said nut for axial movement threwith in said slot.

15. A cutting tool comprising, in combination, an elongated handle member; an elongated carrier member fixed to and extending forwardly from said handle member; a protective casing having an upper portion located over said carrier member and having a pair of substantially parallel, spaced side walls extending downwardly from the upper portion thereof and defining between themselves a space in which at least a forward portion of said carrier member is located; a pair of longitudinal spaced screw members extending threadedly through said upper portion of said casing and respectively having bottom ends slidably engaging a pair of upwardly directed surface portions of said carrier members, respectively, whereby said screw members cooperate with said carrier member for guiding said casing for forward and rearward movement with respect to said carrier member and whereby said screw members may be turned to adjust the elevation of said casing with respect to said carrier member; and manually operable means connected to one of said members and operatively engaging said casing for shifting the latter with respect to said carrier member between a forward operative position and a rearward inoperative position.

References Cited in the file of this patent

UNITED STATES PATENTS 2,629,928      Moravcik _____ Mar. 3, 1953